United States Patent [19]
Nishimura et al.

[11] Patent Number: 5,646,941
[45] Date of Patent: Jul. 8, 1997

[54] DIGITAL DATA TRANSMISSION SYSTEM INCLUDING A DEVICE FOR DATA BLOCK, HEADER AND PACKET GENERATION

[75] Inventors: Takuya Nishimura; Hiroyuki Iitsuka, both of Katano; Hidetoshi Takeda, Neyagawa; Yasunori Kawakami, Osaka, all of Japan

[73] Assignee: Matsushita Electric Industrial Co., Ltd., Osaka-fu, Japan

[21] Appl. No.: 451,423

[22] Filed: May 26, 1995

[30] Foreign Application Priority Data

May 31, 1994 [JP] Japan ..................... 6-118356
Apr. 21, 1995 [JP] Japan ..................... 7-096380

[51] Int. Cl.⁶ ..................................... H04J 3/24
[52] U.S. Cl. ..................... 370/389; 370/466; 370/474
[58] Field of Search ........................... 370/60, 79, 94.1, 370/105.3, 465, 437, 471, 466, 389, 467, 474, 516; 348/461, 469; 358/335, 339

[56] References Cited

U.S. PATENT DOCUMENTS

| | | | |
|---|---|---|---|
| 5,422,879 | 6/1995 | Parsons et al. | 370/60 |
| 5,430,715 | 7/1995 | Corbalis et al. | 370/79 |
| 5,446,726 | 8/1995 | Rostoker et al. | 370/79 |
| 5,493,570 | 2/1996 | Hillman et al. | 370/105.3 |
| 5,497,371 | 3/1996 | Ellis et al. | 370/79 |

OTHER PUBLICATIONS

"IEEE Standard for a High Performance Serial Bus, P1394/Draft 7.1v1", *Microprocessor and Microcomputer Standards Subcommitee of the IEEE Computing Society*, The Institute of Electrical and Electronics Engineers, Inc., New York (Aug. 5, 1994).

*Primary Examiner*—Douglas W. Olms
*Assistant Examiner*—Shick Hom
*Attorney, Agent, or Firm*—Greenblum & Bernstein, P.L.C.

[57] ABSTRACT

A data transmission system suitable for effectively transmitting variety of data such as NTSC, PAL, and MPEG between various devices connected to a bus includes a data block generator generates a data block and a discrimination data identifying the generated data block from the source data. A data header generator generates a data header based on the discrimination data. A packet generator and an interface block generates a packet header and CRC error codes to compose a packet with thus generated data block and header.

15 Claims, 8 Drawing Sheets

DIGITAL DATA TRANSMISSION SYSTEM INCLUDING A DEVICE FOR DATA BLOCK, HEADER AND PACKET GENERATION

BACKGROUND OF THE INVENTION

1. Field of the Invention

The present invention relates to a data transmission system including a transmission apparatus for transmitting a digital signal such as audio signals and/or video signals and a data receiving apparatus for receiving said transmitted signal to record or reproduce thereof, and more particular, to a data transmission system for use in a digital data processing apparatus such as a digital video cassette recorder (VCR) whereby audio signals and/or video signals are recorded and reproduced as digital signals, and also to a method thereof.

2. Description of the Prior Art

Devices for transmitting audio signals and/or video signals via a digital signal transmission path are being continually developed. Transmitting audio signals and/or video signals as a digital signal, however, requires sending and receiving to be synchronized to the processing speed of the apparatus, and therefore requires a transmission path capable of isochronous transmission. A bus connection is even more preferable considering the potential need for two-way communications on a single transmission path whereby plural devices can receive a signal transmitted from a single device.

The Institute of Electrical and Electronic Engineers, Inc. (IEEE) is currently studying a next-generation high speed serial bus protocol under the title P1394 (see "High Performance Serial Bus"). Under the proposed IEEE P1394 standard, isochronous transmission data, including audio signals, video signals, and other real-time data, can be transmitted by isochronous transmission using isochronous packets, which are sent and received every 125 μsec (=1 cycle) to achieve isochronous transmission.

The isochronous transmission control method of IEEE P1394 is described next. When the bus is initialized according to IEEE P1394, a node identifier is automatically assigned to each device connected to the bus (each 'node') as a means of identifying each node. A maximum 64 isochronous packets per cycle can also be sent over the bus. As a result, each isochronous packet is also assigned a channel number ranging in value from 0 to 63 to identify each isochronous packet. To achieve isochronous transmission on plural channels, one of the plural nodes connected to the bus is used for isochronous transmission management; this node is called the "bus manager" below.

The bus manager manages the channel numbers used for isochronous transmission, and the time remaining in each cycle usable for isochronous transmission. The time sharing rate, or the time slot width, required for each node to transmit an isochronous packet in one cycle is referred to as a bandwidth below. To achieve isochronous transmission, the bus manager must reserve the channel number and the bandwidth to be used. It should be noted that communications not essential to isochronous transmission and information that does not require isochronous transmission are transmitted by asynchronous transmission using asynchronous packets. Asynchronous communication is accomplished using cycle time not used for isochronous transmission.

The bus is also immediately reinitialized whenever a node is connected or disconnected from the bus, or whenever any node on the bus is turned off, to enable active bus configuration.

In this data transmission method, the data packet includes two regions, one is a packet header region for arranging the packet header therein and a data region for arranging the digital data therein. At the top of the data region, a data header indicating a format in which the body of data is written is inserted, if necessary. When the data header having a variable length is used, a header length data having an information of how many bytes starting from the top of the data region corresponds represents or constructs the data header is inserted in the data header.

However, the header length data has a fixed length regardless of the length of the data header. Therefore, the ratio of the header length data in the data header varies according to the length of data header. When the data header is short, the ratio is very big. Additionally, more format patterns are required to express the bigger data header, more bits should be reserved for the format discriminator.

In both the above cases, it is impossible to transmit the data effectively. Furthermore, recently so many instruments such as audio and visual devices are connected to the common bus to communicate the information or data through the bus. Each of these devices (nodes) transmits various kinds of data peculiar to itself. To correctly indicates the contents of such various data, so many format patterns are necessary for the data header. A format discriminator indicative of the format pattern used tow rite the data header is inserted in the data header itself before the data transmission so that it is possible to know the format of the data header on the receiving side.

Furthermore, it is to be noted that the data header is not required for communicating the data whose format is known to both the transmission and receiving sides. However, when such a non-header data is transmitted to a receiving apparatus which is not prepared for such non-header data but only for a usual data having a header data at the top portion thereof, the data can not be transmitted correctly as follows. On receipt of the non-header data, the receiving apparatus will simply read this non header data and deprives a portion of this non-header data as a data header. Based on this incorrect header information which is a portion of data body, the receiving apparatus mis-interprets the contents of the received non-header data, and operates incorrectly. To prevent such miss-interpretation, a minimum size of data head should be added to the data before being transmitted. Also in this case, effective data transmission is impossible.

SUMMARY OF THE INVENTION

The object of the present invention is therefore to provide a data transmission system which solves these problems.

The present invention has been developed with a view to substantially solving the above described disadvantages and has for its essential object to provide an improved data transmission system for transmitting a data as a packet having a packet header region for storing a packet header and a data region for storing a data block, said system comprises a data block generation means for producing said data block and a discrimination data indicative of the contents and size of said data block based on said data; a header generation means for generating a data header based on said discrimination data; and a packet generation means for generating said packet based on said data block and said header.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1:
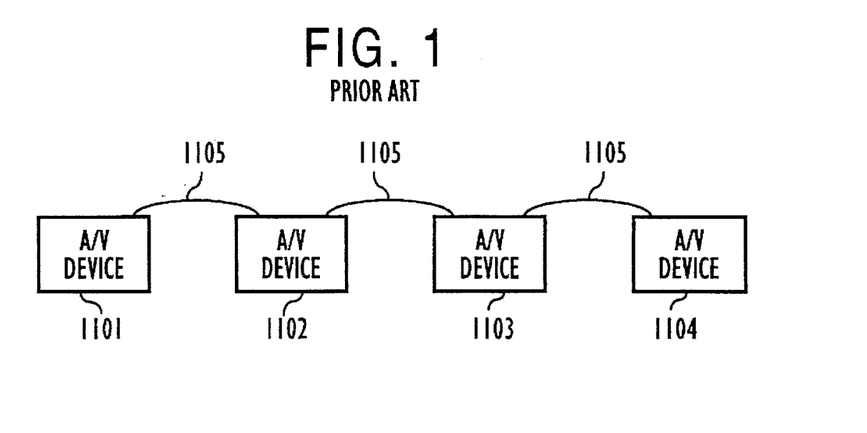
FIG. 1 is a block diagram showing plural audio/visual devices connected to a bus according to the IEEE P1394 protocol.

The present invention relates to a data transmission system for transmitting real-time data such as audio/visual data using the P1394 protocol currently being considered by the Institute of Electrical and Electronic Engineers, Inc. In FIG. 1, a plurality of audio/visual devices connected to a bus according to the IEEE P1394 protocol are shown. In this example, four audio/visual devices are connected to a common bus, and the devices are referred to as nodes. The audio/visual device will be referred to as an A/V device hereinafter for the sake of brevity. The A/V devices 1101, 1102, 1103, and 1104 are connected by a cable 1105 which serves as a bus structure. Each of the A/V devices 1101, 1102, 1103, and 104 has a similar control arrangement.

Figure 2:
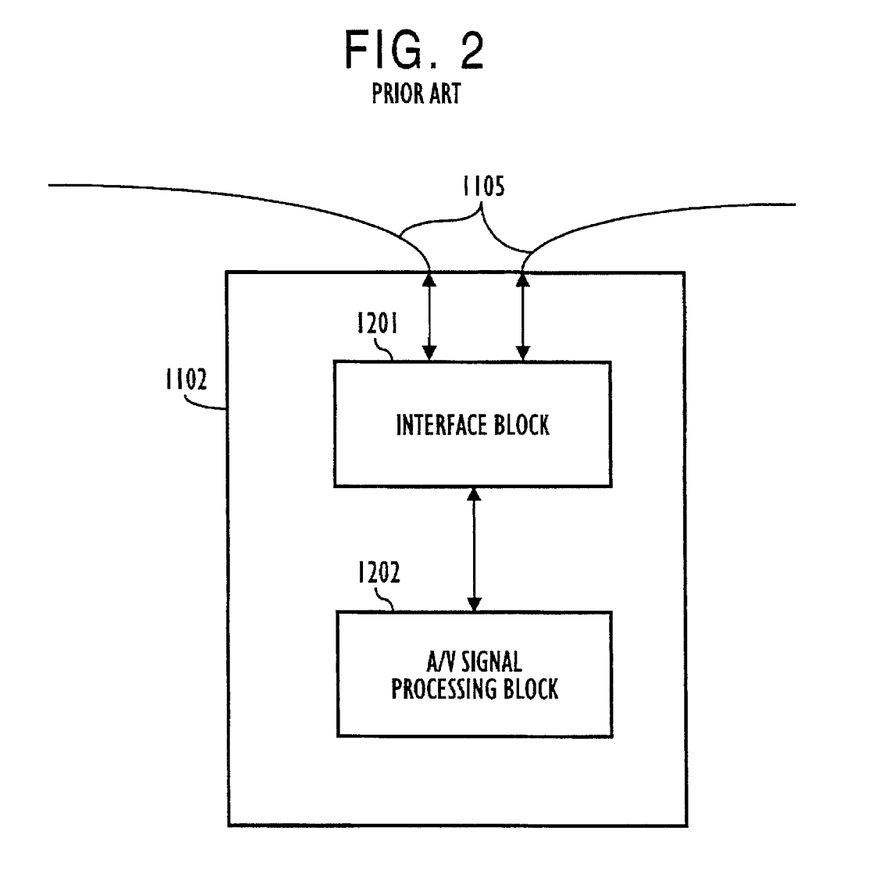
FIG. 2 is a block diagram showing the internal configuration of each audio/visual device shown in FIG. 1.

In FIG. 2, a construction of A/V device 1102 is shown by way of example for A/V devices 1101, 1103, and 1104. The A/V device 1102 includes an interface block 1201 and an A/V signal processing block 1202. Signals input to the A/V device 1102 from the other nodes such as A/V devices 1101, 1103, and 1104 through the cable 1105 are input to the A/V signal processing device 1202 via the interface block 1201. In the interface block 1201, the input signals have their waveform shaped, and this waveform-shaped signals are output to the next A/V device 1103 or 1101. The interface block 1201 is capable of transmitting the signals output from any other A/V device, i.e., any other node when connected according to the IEEE P1394 protocol as shown in FIG. 1, to all other A/V devices (nodes). In the IEEE P1394 protocol, real-time data is transmitted using isochronous packets.

Figure 3:
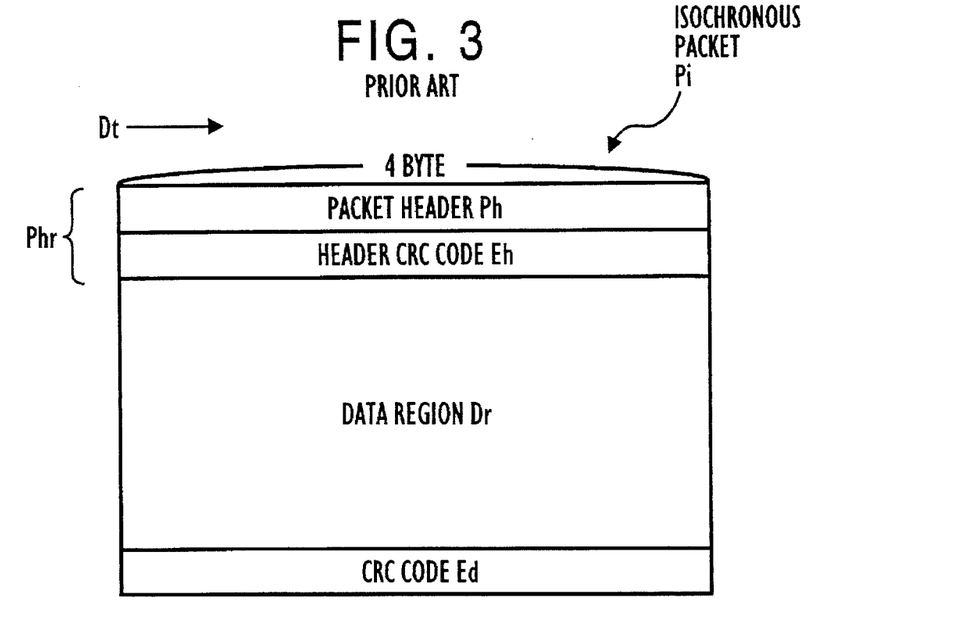
FIG. 3 is a graph showing the isochronous packet format defined by IEEE P1394.

In FIG. 3, a format of an isochronous packet defined by IEEE P1394 is shown. Each isochronous packet Pi includes a 4-byte packet header Ph, a 4-byte header CRC (cyclic redundancy check) code Eh for checking for transmission errors in the packet header Ph, a data region Dr for storing a data, and a 4-byte data CRC code Ed for checking for transmission errors in the real-time data. The packet header Ph and the code Eh constructs a packet header region Phr.

Figure 4:
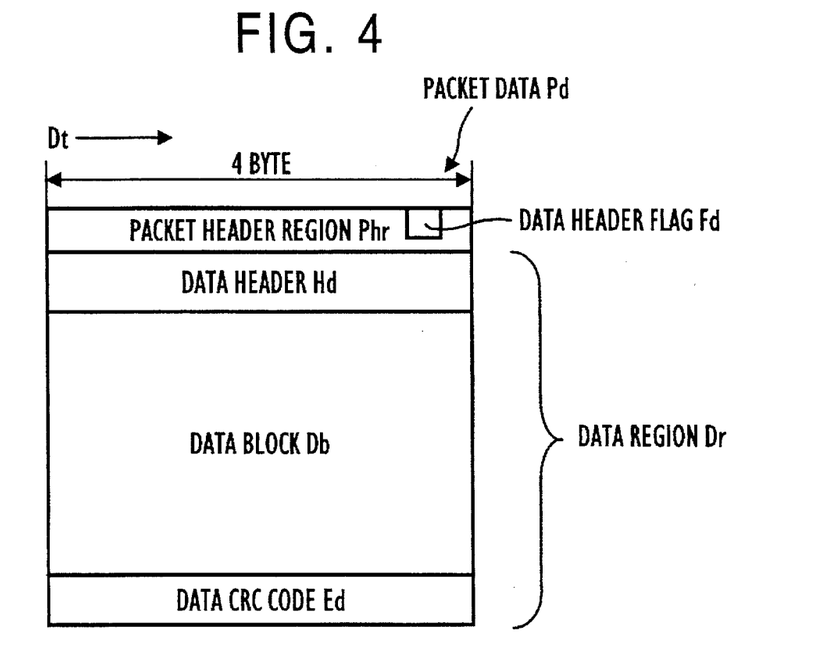
FIG. 4 is a graph schematically showing the data packet according to the present invention.

In FIG. 4, a format of a data packet according to the present invention is schematically shown. The data packet Pd includes the packet header region Phr for storing the packet header Ph and the header CRC code Eh, the data region Dr for storing a data header Hd and a data block Db, and data CRC code Ed. The data header Hd indicates the format in which the data block Db is written in data region Dr. The packet header region Phr also stores a data header flag Fd indicating whether the data header Hd exists at the top of the data region Dr or not. When the value of header flag Fd is, for example, "1", it is indicated that the data header Hd exists at the top of the data region Dr. When the value of data header flag Fd is "0", the data region Dr is not written with the data header Hd but only with the data block Db. In other words, the data header flag Fd indicates the existence of the data header Hd in the present packet data Pd.

Figure 5:
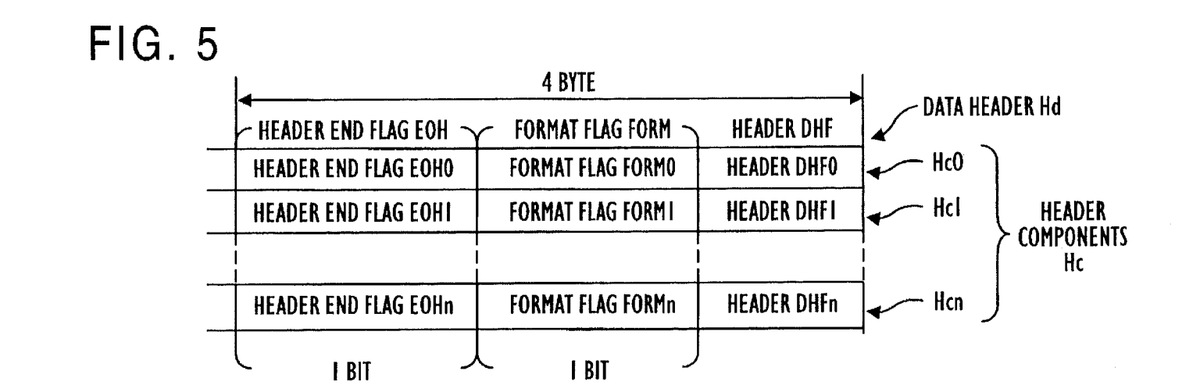
FIG. 5 is a graph schematically showing the details of the data header in the data packet of FIG. 4.

As specifically shown in FIG. 5, the data header Hd includes "n+1" header components Hc0 to Hcn. It is to be noted that "n" is a positive integer including zero. Each header component Hc includes a header end flag EOH, a format flag FORM, and a header DHF serially arranged from the top thereof. The header end flag EOH is one bit data indicating whether the next header component (Hc) is provided after the present header component Hc or not. The format flag FORM is also one bit data, and is used in combination of the header end flag EOH to identify a pattern of format in which the header DHF is written. Thus, both flags EOH and FORM act as a header length discriminator identifying the length of the data header Hd and a format discriminator identifying the format of the data Pd.

Specifically, when a first header end flag EOH0 of a first header component Hc0 is "0" for example, it is indicated that another (second) header component Hc1 exists after the first header component Hc0. However, when the first header end flag EOH0 is "1", no other header component Hc is provided after the first header component Hc0. In other words, when the "m-th" header flag EOHm ("m" is a positive integer smaller than "n") is "1", there is no header component provided after the present header component.

Therefore, the values of first header end flag EOH0 and header format flag FORM0 can be any one of four combination patterns indicated such as (0, 0), (0,1), (1, 0), and (1, 1). It is to be noted that each of numbers in the parentheses indicates the value of the first header end flag EOH0 and the first header format FORM0, respectively. As shown in first and second combination patterns, when the first header end flag EOH0 is "0", the second header component Hc1 exists. The second header end flag EOH1 also indicates whether the third header component Hc2 next to the second component Hc1 exists or not. The second format flag FORM1 also indicates a pattern of format in which the second header DHF1 is written in combination of the first header end flag EOH0 and header format flag FORM0, and the second header end flag EOH1.

In other words, the second header DHF1 can be written in eight of different format patterns which are individually identified by combination patterns indicated such as (0,0,0, 0), (0,0,0,1), (0,0,1,0), (0,0,1,1,), (0,1,0,0), (0,1,0,1), (0,1,1, 0), and (0,1,1,1). It is to be noted the each of numbers in the parentheses indicates the value of the first header end flag EOH0, the first header format FORM0, the second header end flag EOH1, and the second header format FORM1, respectively. Therefore, the format of "m-th" header DHFm can be distinctly identified by a combination of "m+1" header end flags EOH0 to EOHm and header format flags FORM0 to FORMm. With reference to FIGS. 6A, 6B, 6C, 6D, 6E, and 6F, the relationship between the patterns of header format and the combination of header end flag EOH and header format flag FORM is described below.

Figure 6A:
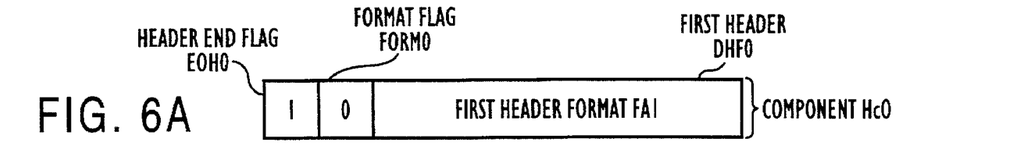
FIGS. 6A, 6B, 6C, 6D, 6E, and 6F are graphs showing the various format patterns of the data header of FIG. 5.
Figure 6B:
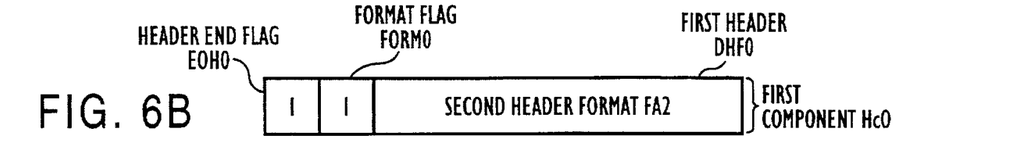

In FIGS. 6A and 6B, the data headers Hd having only the first header component Hc0 are shown. Since the first header end flag EOH0 is "1" in both cases, it can be identified that the data header Hd does not has any header component other than the present component Hc0. As a result, the format of the header DHF0 can be exclusively identified by the value of the first header format flag FORM0. Therefore, a format pattern of the header DHF0 when the flag FORM0 is "0" is designated as a first header format FA1, as shown in FIG. 6A. When the FORM0 is "1", designated as a second header format FA2, as shown in FIG. 6B.

Figure 6C:
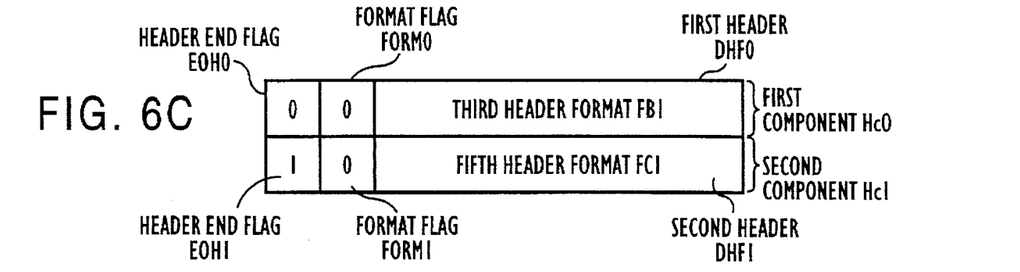
Figure 6D:
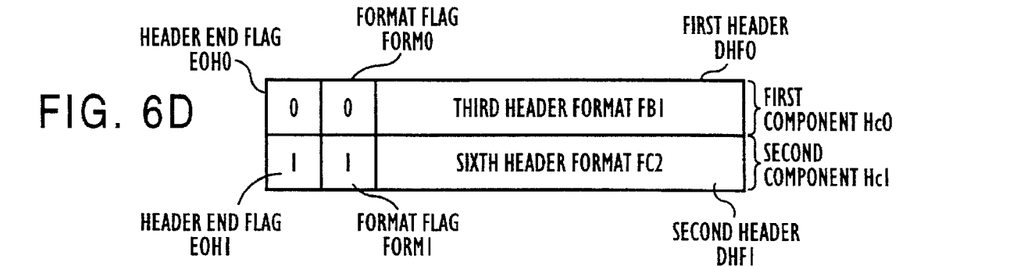
Figure 6E:
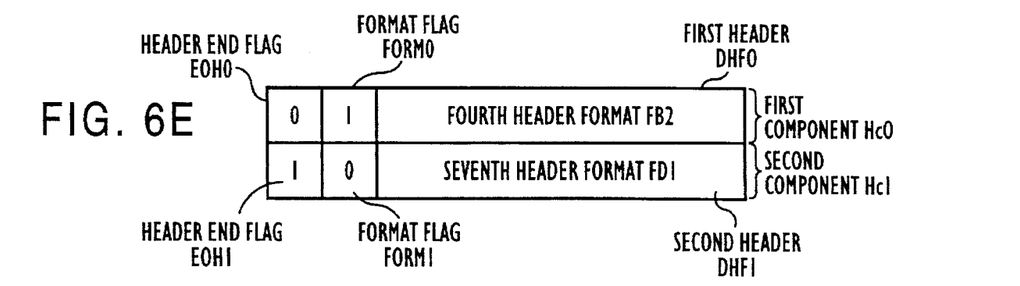
Figure 6F:
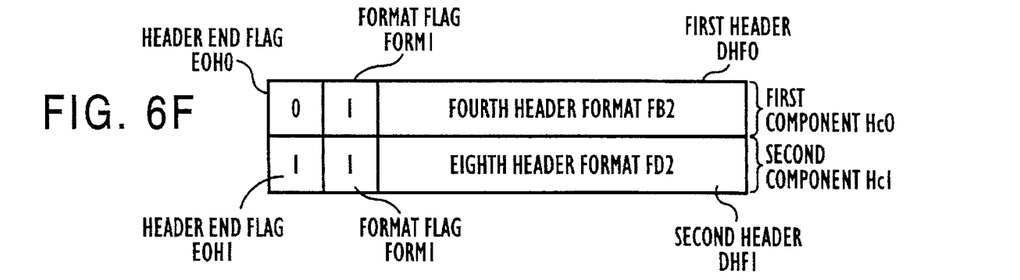

In FIGS. 6C, 6D, 6E, and 6F, the data headers Hd having two, the first and second, header components Hc0 and Hc1 are shown. Since the value of the first header end flag EOH0 included in the first header component Hc0 is "0", it is identified that the data header Hd further has another header component which is the second component Hc1. Note that the format pattern of the first header DHF0 of the first component Hc0 can be distinctly identified by the two combination patterns (0,0) and (0,1) of the first header end flag EOH0 and header format flag FORM0. A pattern indicated as (0,0) is designated as a third header format FB1, as shown in FIGS. 6C and 6D. A pattern indicated as (0,1) is designated as a fourth pattern of header format FB2, as shown in FIGS. 6E and 6F.

Further to the second component Hc1, since the second header end flag EOH1 is "1", it is identified that each of the data headers Hd shown in FIGS. 6C, 6D, 6E, and 6F has no other (third) header component (Hc2). It is apparent that the format pattern of the second header DHF1 can be discriminated by assigning any of the following four combination of the first and second header end flags EOH0 and EOH1 and first and second header format flags FORM0 and FORM1. These combinations can be indicated such as (0,0,1,0), (0,0,1,1), (0,1,1,0), and (0,1,1,1) which are designated as a fifth, sixth, seventh, and eighth header format patterns FC1 (FIG. 6C), FC2 (FIG. 6D), FD1 (FIG. 6E), and FD2 (FIG. 6F), respectively. Each of those designated format patterns indicates the way previously defined how to interpret the information read out from the data arranged in the data header DHF.

Note that the data transmitting apparatus arranges a data in the above described format to designate the lengsignated as a fifth, sixth, seventh, and eighth header format patterns FC1 (FIG. 6C), FC2 (FIG. 6D), FD1 (FIG. 6E), and FD2 (FIG. 6F), respectively. Each of those designated format patterns indicates the way previously defined how to interpret the information read out from the data arranged in the data header DHF.

Note that the data transmitting apparatus arranges a data in the above described format to designate the wn in FIG. 5, the data header Hd includes "n+1" header components Hc0 to Hcn. It is to be noted that "n" is a positive integer including zero. Each header component Hc includes a header end flag EOH, a format flag FORM, and a header DHF serially arranged from the top thereof. The header end flag EOH is one bit data indicating whether the next header component (Hc) is provided after the present header component Hc or not. The format flag FORM is also one bit data, and is used in combination of the header end flag EOH to identify a pattern of format in which the header DHF is written. Thus, both flags EOH and FROM act as a header length discriminator identifying the length of the data header Hd and a format discriminator identifying the format of the data Pd.

Specifically, when a first header end flag EOH0 of a first header component Hc0 is "0" for example, it is indicated that another (second) header component Hc1 exists after the first header component Hc0. However, when the first header end flag EOH0 is "1", no other header component Hc is provided after the first header component Hc0. In other words, when the "m-th" header flag EOHm ("m" is a positive integer smaller than "n") is "1", there is no header component provided after the present header component.

Therefore, the values of first header end flag EOH0 and header format flag FORM0 can be any one of four combination patterns indicated such as (0, 0), (0,1), (1, 0), and (1, 1). It is to be noted that each of numbers in the parentheses indicates the value of the first header end flag EOH0 and the first header format FORM0, respectively. As shown in the first and second combination patterns, when the first header end flag EOH0 is "0", the second header component Hc1 exists. The second header end flag EOH1 also indicates whether the third header component Hc2 next to the second component Hc1 or not. The second format flag FORM1 also indicates a pattern of format in which the second header DHF1 is written in combination of the first header end flag EOH0 and header format flag FORM0, and the second header end flag EOH1.

In other words, the second header DHF1 can be written in eight of different format patterns which are individually identified by combination patterns indicated such as (0,0,0, 0), (0,0,0,1), (0,0,1,0), (0,0,1,1,), (0,1,0,0), (0,1,0,1), (0,1,1, 0), and (0,1,1,1). It is to be noted the each of numbers in the parentheses indicates the value of the first header end flag EOH0, the first header format FORM0, the second header end flag EOH1, and the second header format FORM1, respectively. Therefore, the format of "m-th" header DHFm can be distinctly identified by a combination of "m+1" header end flags EOH0 to EOHm and header format flags FORM0 to FORMm. With reference to FIGS. 6A, 6B, 6C, 6D, 6E, and 6F, the relationship between the patterns of header format and the combination of header end flag EOH and header format flag FORM is described below.

In FIGS. 6A and 6B, the data headers Hd having only the first header component Hc0 are shown. Since the first header end flag EOH0 is "1" in both cases, it can be identified than the data header Hd does not has any header component other than the present component Hc0. As a result, the format of the header DHF0 can be exclusively identified by the value of the first header format flag FORM0. Therefore, a format pattern of the header DHF0 when the flag FORM0 is "0" is designated as a first header format FA1, as shown in FIG. 6A. When the FORM0 is "1" designated as a second header format FA2, as shown in FIG. 6B.

In FIGS. 6C, 6D, 6E, and 6F, the data headers Hd having two, the first and second, header components Hc0 and Hc1 are shown. Since the value of the first header end flag EOH0 included in the first header component Hc0 is "0", it is identified that the data header Hd further has another header component which is the second component Hc1. Note that the format pattern of the first header DHF0 of the first component Hc0 can be distinctly identified by the two combination patterns (0,0) and (0,1) of the first header end flag EOH0 and header format flag FORM0. A pattern indicated as (0,0) is designated as a third header format FB1, as shown in FIGS. 6C and 6D. A pattern indicated as (0,1) is designated as a fourth pattern of header format FB2, as shown in FIGS. 6E and 6F.

Further to the second component Hc1, since the second header end flag EOH1 is "1", it is identified that each of the data headers Hd shown in FIGS. 6C, 6D, 6E, and 6F has no other (third) header component (Hc2). It is apparent that the format pattern of the second header DHF1 can be discriminated by assigning any of the following four combination of the first and second header end flags EOH0 and EOH1 and the first and second header format flags FORM0 and FORM1. These combinations can be indicated such as (0,0,1,0), (0,0,1,1) (0,1,1,0), and (0,1,1,1) which are designated as a fifth, sixth, seventh, and eighth header format patterns FC1 (FIG. 6C), FC2 (FIG. 6D), FD1 (FIG. 6E), and FD2 (FIG. 6F), respectively. Each of those designated format patterns indicates the way previously defined how to interpret the information read out from the data arranged in the data header DHF.

Note that the data transmitting apparatus arranges a data in the above described format to designate the length of data header DHF and the format pattern of header components Hc before transmitting the data packet Pd. On receipt of the data packet Pd transmitted from the data transmitting apparatus, the data receiving apparatus checks the header flag Fd in the packet head region Phr to know whether the data packet Pd includes the data header Hd or not. When the flag Fd is "1" meaning that the data header Hd is provided in the data packet Pd in this embodiment, the data receiving apparatus reads the top portion of the data area Dr as the data header Hd. Based on the information thus read out from the data header Hd, the length of data headers DHF and the format patterns of header components Hc are detected for the further processing by the apparatus.

Figure 7:
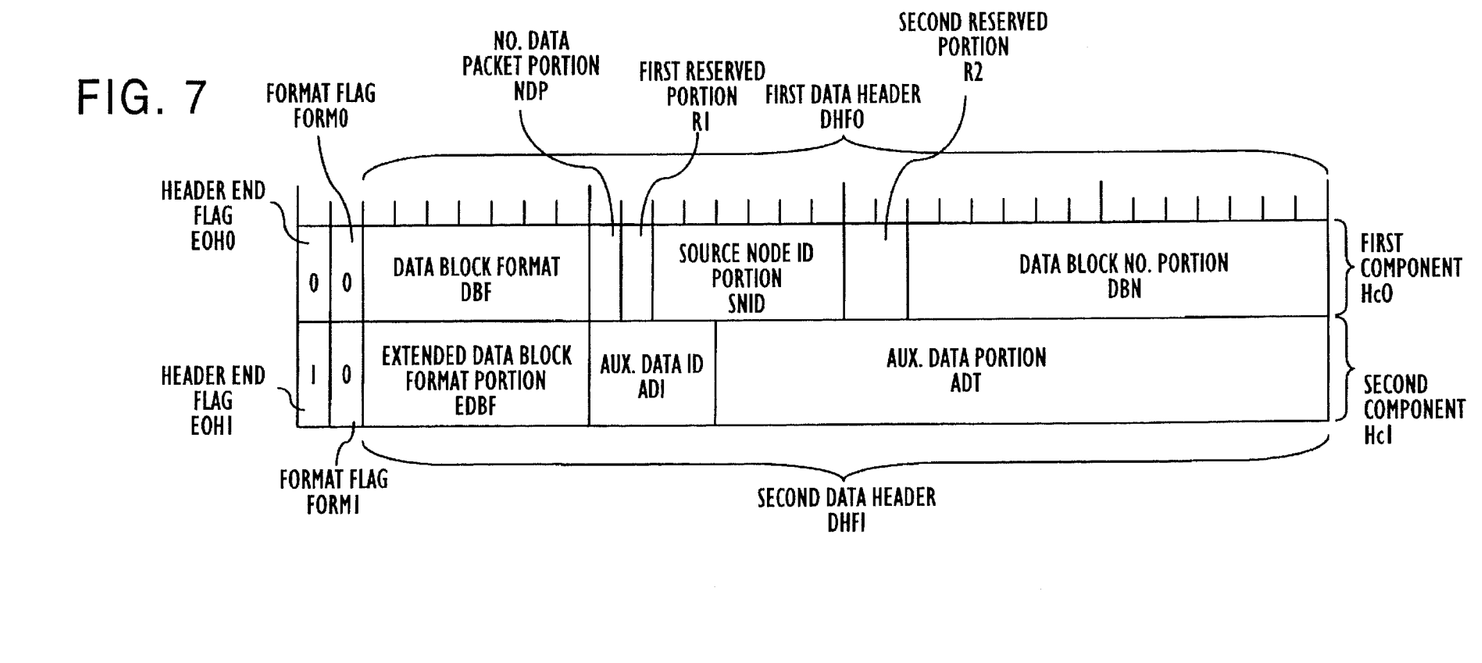
FIG. 7 is a graph showing one format example of the data header of FIGS. 6A, 6B, 6C, 6D, 6E, and 6F.

In FIG. 7, an example of the first and second header components HC0 and HC1 according to an embodiment of the present invention is shown. The first data header DHF0 of the first header component HC0 comprises six portions, a data block format portion DBF, a no data packet portion NDP, a first reserved portion R1, a source_node_ID portion SNID, a second reserved portion R2, and a data block number portion DBN which are arranged in a serial order after the first header format flag FORM0, as shown. The first portion DBF is used to indicate the kind of the data Db or the format in which the data Db is written. The second portion NDP is used to indicate the existence of the data in the data packet Pd. The third and fifth portions R1 and R2 are reserved for storing the data for later use. The fourth pot%ion SNID is used for the source_node_ID identifying the ID of the apparatus which transmitted the data packet Pd. The sixth potation DBN is used to indicate the packet No.

The second data header DHF1 of second header component HC1 comprises three portions, EDBF, ADI, and ADT serially arranged after the second header format flag FORM1. The extended data block format portion EDBF is used to supplement to the data block format portion DBF of the first header component HC0. The auxiliary data ID portion ADI is used to store the auxiliary data. The auxiliary data portion ADT is used to indicate the contends of the data stored in the portion ADT.

The header data DHF0 and DHF1 shown in FIG. 7 are written in the formats FB1 and FC1, respectively, described above with reference to FIG. 6C. On receipt of thus formatted data packet Pd, the data receiving apparatus serially reads packet data Pd from the top thereof. The receiving apparatus detects the existence of the data header Hd when "1" is read our from the flag Fd in the packet header region Ph, and further reads the data region Dr from the top thereof as the data header Hd.

The receiving apparatus detects that the data header Hd (data packet Pd) includes at least two header components HC0 and HC1 when "0" is read out from the first header end flag EOH0. Then, after reading "0" from the first format flag FORM0, the apparatus detects that the first header data DHF0 is written in the third format pattern FB1 based on the combination (0, 0) of flags EOH0 and FORM0. The receiving apparatus reads the first header DHF0 to extract the distinct information each of potions DBF, NDP, R1, SNID, R2, and DBN in consideration of thus detected format pattern FB1.

Since the first header end flag EOH0 indicates the existence of the second header component Hc1, the receiving apparatus continually reads the next portion of data header Hd corresponding to the second components Hc1. On detection of the values (1,0) of the second flags EOH1 and FORM1, it is detected that the second header data DHF1 is written in the fifth format pattern FC1 based on the combination (0, 0) of flags EOH0 and FORM0. Similarly, the information is distinctly extracted from each of portions EDBF, ADI, and ADT in consideration of thus detected format pattern FC1. Furthermore, when "1" is read out from the second header end flag EOH1, the receiving apparatus detects that the data packet Pd does not have the third header component Hc2. This means that it is not necessary to check any portion other than the second header component Hc1 of the data region Dr to extract the header information.

Furthermore, the format pattern of the first data header DHF1 can be changed from FC1 to FC2, if necessary, by changing the value of the second format flag FORM0 from "0" to "1". In this case, the data potions ADI and ADT, for example, according to the format pattern FC1 can be used for another usage according to the format FC2 which is so defined previously. Since the formats of other header components Hc are similar to that of the second component Hc1, the detailed description is omitted for the sake of brevity.

It is to be noted that the ratio of both the discriminators EOH and FORM to the data header Hd is the same and constant regardless of number of header component Hc. As best shown in FIG. 6A, when the packet data Pd has only one header component Hc0, only two bits are used for both discriminators EOH0 and FORM0. Similarly, when the packet data Pd has two header components Hc0 and Hc1, only two bits per each component Hc are used, as shown in FIG. 6C. As a result, the ratio of discriminators (flags) EOH and FORM to the header Hd is constant regardless of the number of components Hc.

However, the combination pattern of these discriminators EOH and FORM widely varies as the data header Hd includes more header components Hc according to the present invention. As shown in FIGS. 6A, 6B, 6C, 6D, 6E, and 6F, it is two format patterns FA1 and FA2 that can distinctively identified when the data header Hd includes only one component Hc. Six format patterns FA1, FA2, FB1, FB2, FC1, and FC2 can be identified when the data header Hd includes two components Hc. As apparent, thus the number of format patterns can be easily increased by increasing the number of header components Hc. This is very convenient for the transmission of the data having so many various contents which can be discriminated by assigning thus increased format patterns. Because, nowadays, it is required for the data transmission system to transmit complicated and various kind such as NTSC, PAL, and MPEG of data which are outputted by various kinds of devices connected to the bus, because such data needs various format pattern peculiar to itself.

Figure 8:
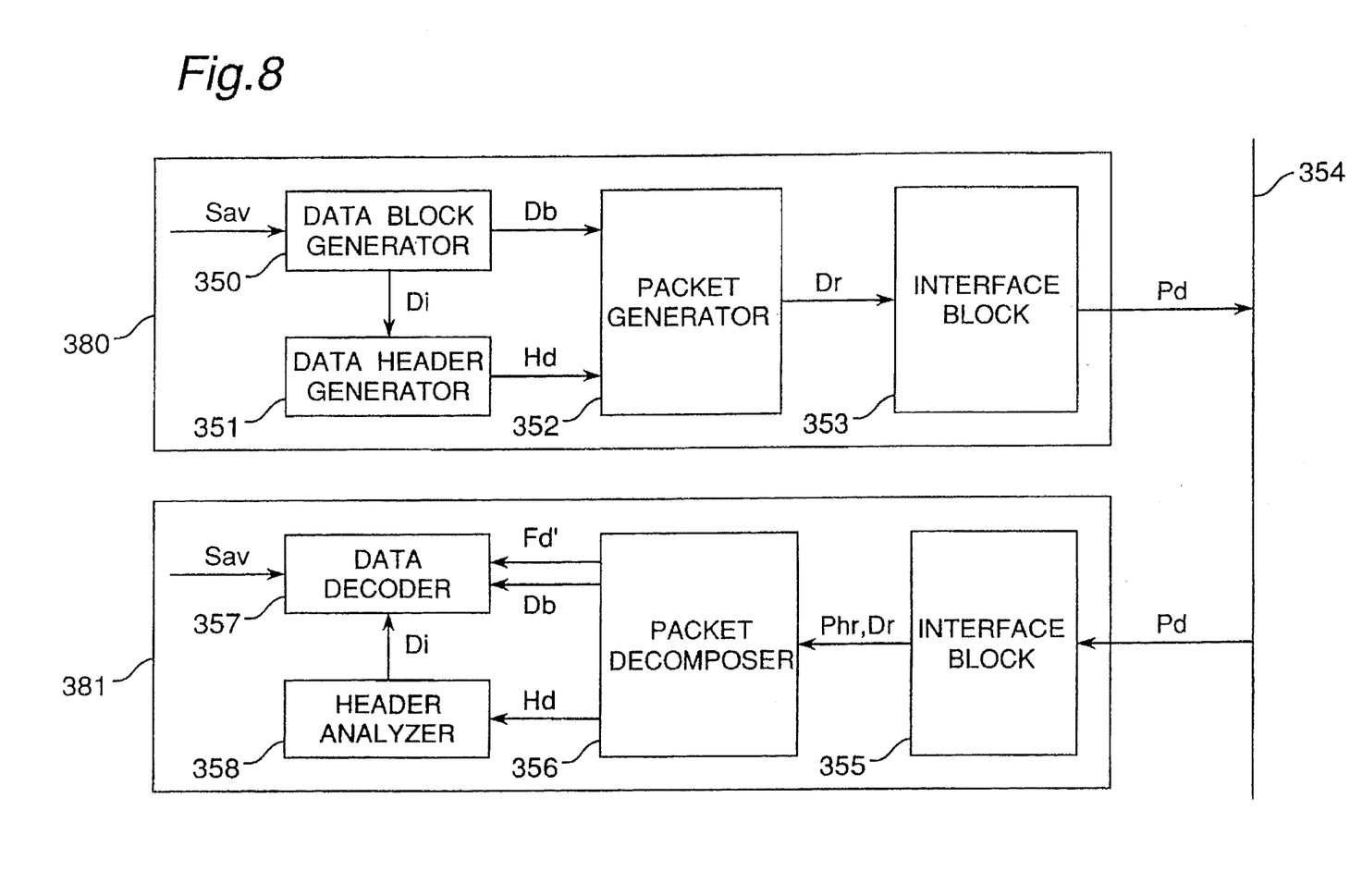
FIG. 8 is a hock diagram showing a data transmission apparatus and a data receiving apparatus according to the present invention.

Referring to FIG. 8, a data transmission apparatus 380 and a data receiving apparatus 381 according to an embodiment of the present invention are shown. The data transmission apparatus 380 and the data receiving apparatus 381 is connected to a bus 354 for communicating the data packet Pd therebetween. The data transmission apparatus 380 has a data block generator 350, a data header generator 351, a packet generator 352, and an interface block 353.

The data block generator 350 is connected to an audio/video data source (not shown) for receiving an audio/video data Sav having predetermined format and type in a form of data stream therefrom to generate the data block Db. The data generator 350 further generates a discrimination information data Di indicating the length and contents of the generated data corresponding to the header end flag EOH and format flag FORM.

The data header generator 351 is connected to the data block generator 350 for receiving the discrimination data EOF and FORM to generate the data header Hd indicating the contents and the length of data block Db. This data header Hd is selected from one of format patterns FA1 to FD2 or later which was described above with reference to FIGS. 6A to 6F. The details of header generator 351 will be described later with reference to FIG. 9.

The packet generator 352 is connected to the data block generator 350 and the data header generator 351 for receiving the data block Db and the data header Hd therefrom, respectively. The packet generator 352 combines the data block Db and the header Hd to generate the data region data Dr.

The interface block 353 is connected to the packet generator 352 for receiving the data unit Dr therefrom to generate a header region data Phr including the packet header Ph and the header CRC code Eh, and further to generate the data CRC code Ed. The header region data Phr is provided with the data header flag Fd having the value of "1" when the data header Hd is included, and "0" when not. The interface block 353 further combines thus generated header region data Phr, the data region data Dr, and the CRC code Ed to generate the packet data Pd, and is further connected to the bus 354 for transmitting thus generated packet data Pd to the data receiving apparatus 381 or other A/V devices therethrough.

Figure 9:
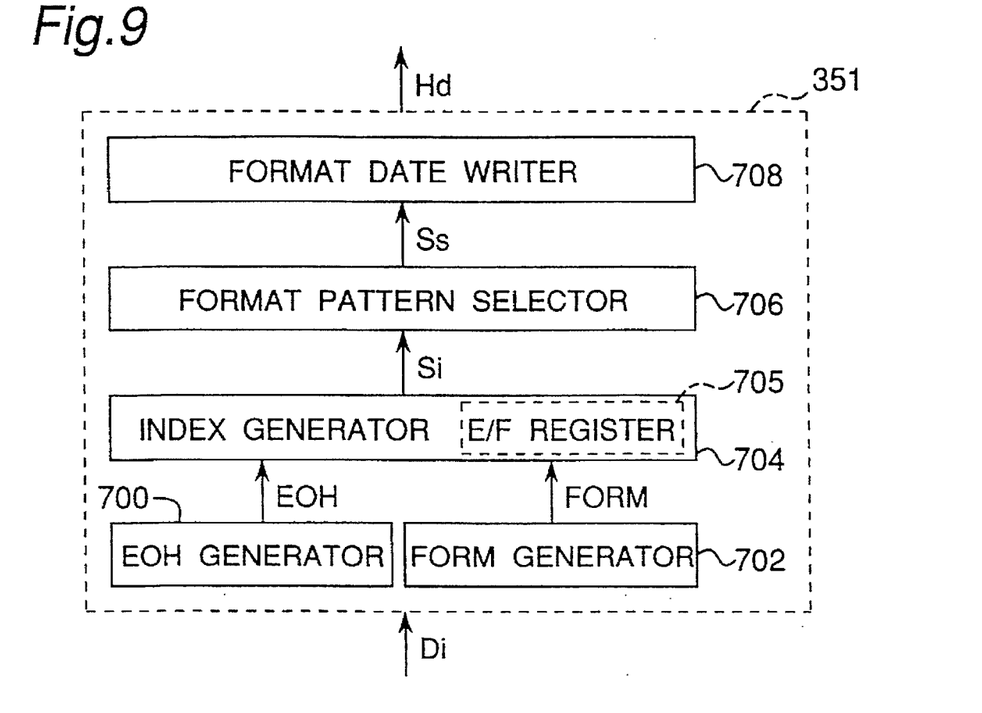
FIG. 9 is a block diagram showing the details of the data header generator of FIG. 8.

Referring to FIG. 9, the data header generator 351 is shown. The data header generator 351 includes a header end flag generator 700, a format flag generator 702, an index generator 704, a format pattern selector 706, and a format data writer 708. The flag generators 700 and 702 generate the header end flag EOH and the format flag FORM, respectively, based on the discrimination data Di from the data block generator 350.

The index generator 704 is connected to both the flag generators 700 and 702 to generate an index signal Si based on those flags EOH and FORM. The index generator 704 has an E/F register 705 which receives and reserves those flags EOH and FORM until when the header end flag EOH becomes "1". Thus, the index signal Si corresponding to the combination of those flags EOH and FORM identifying the data block Db is generated. Based on thus generated index signal Si, the format pattern selector 706 selects one of the format patterns FA1 to FD2 or later and generates a selection signal Ss. Based on this selection signal Ss, the format data writer 708 writes the data header Hd according to the selected format pattern.

Referring back to FIG. 8, the data receiving apparatus 381 includes an interface block 355, a packet decomposer 356, a header analyzer 358, and a data decoder 357 which are connected to each other, as shown. The interface block 355 is connected to the bus 354 for receiving the data packet Pd transmitted from the data transmission apparatus 380 to check the accuracy of the data region data Dr and the packet header Ph based on the CRC codes Ed and Eh, respectively. When the accuracy of both the data region data Dr and packet header Ph is confirmed, the interface block 355 derives the packet data Pd of the data CRC code Ed to extract the data region data Dr together with the header region data Phr therefrom. Thus extracted data region data Dr and Phr are supplied to the packet decomposer 356.

The packet decomposer 356 checks the existence of the data header Hd in the data region data Dr based on the data flag Fd included in the header region data Phr, and then outputs the value of data flag Fd as a header existence information data Fd' to the data decoder 357. The packet decomposer 356 decomposes the data region data Dr into the data block Db and the data header Hd with respect to the boundary which is determined by the header end flag EOH included in the data header Hd. These decomposed data block Db and data header Hd are transferred to the data decoder 357 and the header analyzer 358, respectively. It is to be noted that when the data flag Fd indicates the absence of the data header Hd meaning that no data header Hd is included, the entire part of the data region data Dr is transferred to the data decoder 357 as the data block Db.

The header analyzer 358 analyzes the format of the data block Db based on the data header Hd inputted from the packet decomposer 356, and outputs the analysis result as an data discrimination information data Di to the data decoder 357. The details of header analyzer 358 will be described later with reference to FIG. 10.

The data decoder 357 decodes the data block Db into the source signal Sav based on the header existence information Fd' and the data discrimination information Di received from the packet decomposer 356 and the header analyzer 358, respectively.

Figure 10:
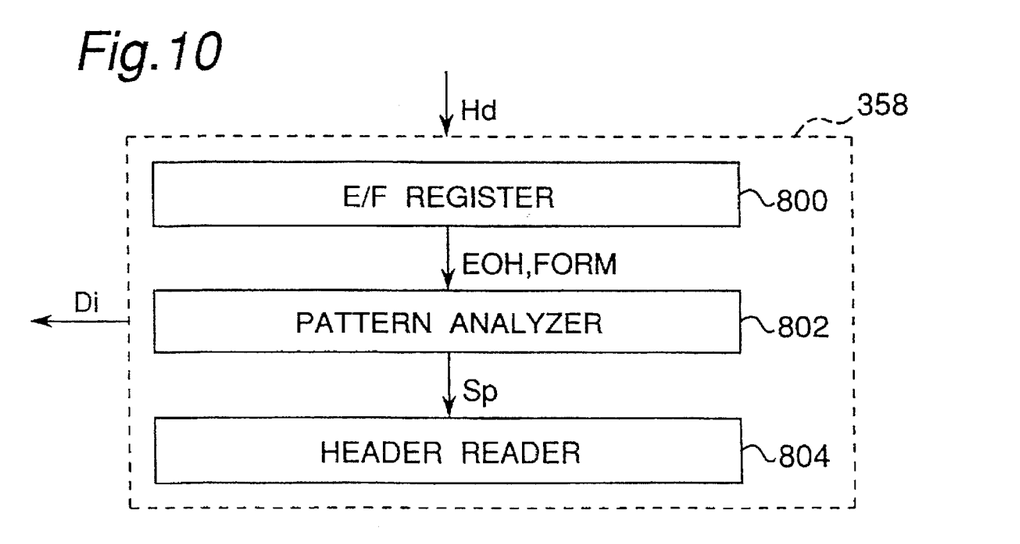
FIG. 10 is a block diagram showing the details of the header analyzer of FIG. 8.

Referring to FIG. 10, the header decomposer 358 is shown. The header decomposer 358 includes an E/F register 800, a pattern analyzer 802, and a header reader 804 connected to each other, as shown. The E/F register 800 reads the value of flags EOH and FORM included in the data header Hd realtime, and reserves thus read values until when the header end flag EOH having "1" is read. The pattern analyzer 802 analyzes the format pattern of the data header Hd based on thus reserved values of flags EOH and FORM, determines one of format pattern FA1 to FD2 or later corresponding to the combination of those flags, and then produces a pattern signal Sp indicative of thus determined format pattern. The header reader 804 reads the data from the data header Hd to interpret according to the format pattern indicated by the pattern signal Sp. Then, thus interpreted data information Di is output to the data decoder 357.

Figure 11:
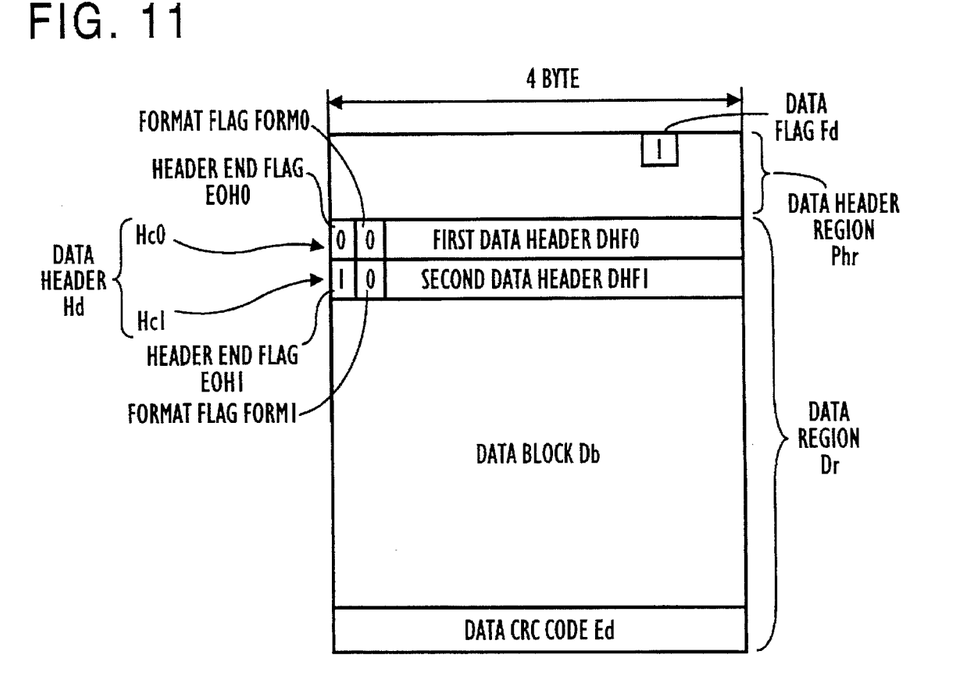
FIG. 11 is a graph schematically showing one example of the data packet according to the present invention.

Referring to FIG. 11, on example of the packet data Pd according to the preferred embodiment of the present invention is shown schematically. This packet data or bus packet Pd is transmitted to the bus 354 from the data transmission apparatus 380 through the interface block 353, and is then taken in by the data receiving apparatus 381 through the interface block 355. Since the bus packet Pd has the data header Hd therein, the data flag Fd included in the packet header regions Phr has the value of "1". The data header Hd has two header components Hc0 and Hc1, and is comprised of 8 bytes data. Therefore, the header end flags EOH0 and EOH1 have the value of "0" and "1", respectively.

The bus packet (packet data) Pd including the data block Db of a construction and kinds corresponding to the information described in the data headers DHF0 and DHF1 is transmitted from the data transmission apparatus 380. Furthermore, the format pattern in which the first data header DHF0 is written is inevitably determined by the combination of the first header end flag EOH0 and the first format flag FORM0. The format pattern of the second data header DHF1 is also inevitably determined by the combination of the first and second header end flags EOH0 and EOH1 and the first and second format flags FORM0 and FORM1.

Figure 12:
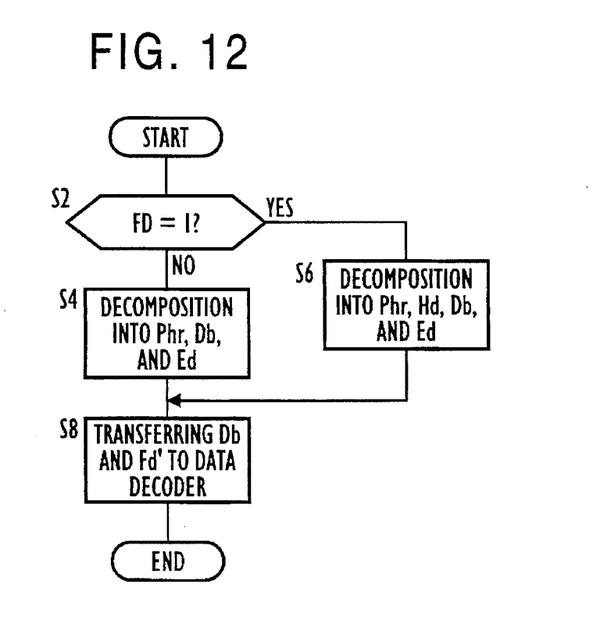
FIG. 12 is a flow chart showing the operation of a packet decomposer used in the data receiving apparatus of FIG. 8.
Figure 13:
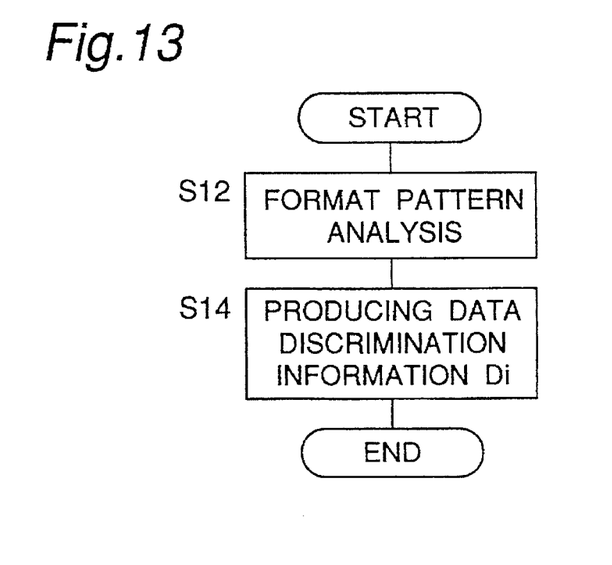
FIG. 13 is a flow chart showing the operation of a header analyzer used in the data receiving apparatus of FIG. 8.
Figure 14:
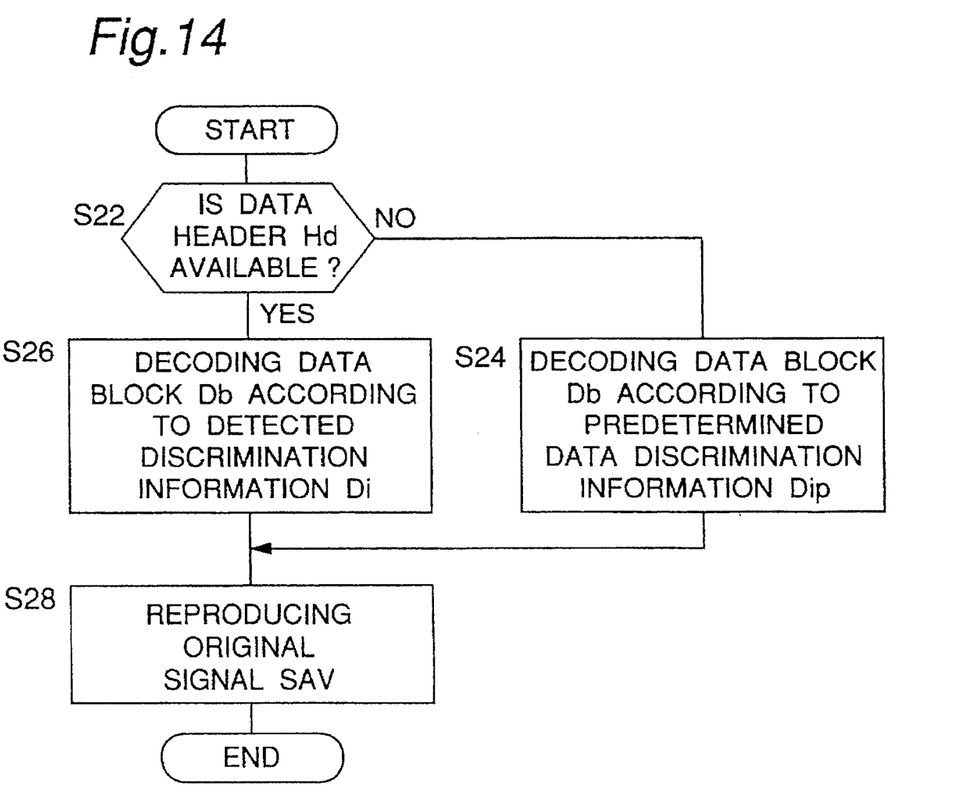
FIG. 14 is a flow chart showing the operation of a data decoder used in the data receiving apparatus of FIG. 8.

With reference to FIGS. 12, 13, and 14, the operations of packet decomposer 356, packet analyzer 358, and data decoder 357 of the data receiving apparatus 381 in FIG. 8 are described below.

In FIG. 12, a flow chart of data processing by the packet decomposer 356 is shown. On receipt of the data block Db and the packet data Pd (Phr+Dr) having both the CRC codes Ed deprived therefrom by the interface block 355, the packet decomposer 356 operates as follows.

At step S2 it is Judged whether the data header Hd is available in the deprived packet data (Phr+Dr), or not, based on the data flag Fd. Then, a data header existence information data Fd' is produced. When it is judged "NO", the procedure advances to step S4.

At step S4, the deprived packet data (Phr+Dr) is decomposed into the data header region data Phr, the data block Db, and the data CRC code Ed, because there is no data header Hd. Then, the procedure advances to step S8.

It is to be noted that the data region data Dr is decomposed into the data header Hd and the data block Db along the boundary which is determined with respect to the header end flag(s) EOH included in the data header Hd. Specifically speaking, when the data flag Fd is "1", one of data header (Hc0) having 4 bytes data is included in the packet data Pd. In this case, the first bit of the first 4 bytes of the data header Hd, which is the first header end flag EOH0, is checked. When the first flag EOH0 is "0", the first bit of the next 4 byes of the data header, which is the second header end flag EOH1 is checked. Since the second flag EOH1 is "1", as best shown in FIG. 11, it is determined that the second header component Hc1 is the final of the data header Hd, and that the data header Hd is comprised of 8 bytes data.

At step S8, the decomposed data block Db together with the data header existence information Fd' are transferred to the data decoder 357. Then, the procedure terminates.

However, when it is Judged "YES" at Step S2, the procedure advances to step S6.

At step S6, the deprived packet data (Phr+Dr) is decomposed into the data header region data Phr, the data header Hd, the data block Db, and the data CRC code Ed. This decomposed data header Hd is transferred to the data decoder 357. The procedure advances to step S8, and then terminates.

In FIG. 13, a flow chart of header analyzing process by the header analyzer 358 is shown. On receipt of the data header Hd from the packet decomposer 356, the packet analyzer 358 operates as follows.

At step S12, the format pattern of the data header Hd is detected based on the header end flag EOH and the form flag FORM included therein. The first data header DHH0 can be written in four distinguishable format patterns corresponding to the four combination patterns of flags EOH0 and FORM0 indicated such as (0, 0), (0,1), (1, 0), and (1, 1). The first and second combination patterns (0, 0) and (0,1), wherein the first header end flag EOH0 is "0", indicate that the header Hd is comprised of at least two header components Hc0 and Hc1 (8 bytes in this embodiment). The third and fourth combination patterns (1,0) and (1,1), wherein the first header end flag EOH0 is "1", indicate that the data header Hd is comprised of a single header component Hc0 (4 bytes in this embodiment).

Furthermore, the second data header DHF1 can be written in eight distinguishable format patterns corresponding to the eight combination patterns of flags EOH0, FORM0, EOH1, and FORM1 indicated such as (0, 0, 0, 0), (0, 0, 0, 1), (0, 0, 1, 0), (0, 0, 1, 1), (0, 1, 0, 0), (0, 1, 0, 1), (0, 1, 1, 0), and (0, 1, 1, 1).

The first, second, fifth, and sixth combination patterns, wherein the second end flag EOH1 is "0", indicate that the header Hd is comprised of at least three header components Hc0, Hc1, and Hc2 (12 bytes in this embodiment). The rested third, fourth, seventh, and eight combination patterns, wherein the second header end flag EOH1 is "1", indicate that the header Hd is comprised of two header components Hc0 and Hc1 only (8 bytes in this embodiment).

As previously described, the data header Hd is selected from one of the predetermined format patterns FA1 to FD2 or later so that each of flags EOH0, FROM0, EOH1, and FROM1, for example in this embodiment, is written with "0" or "1" according to thus selected format pattern. Therefore, the header analyzer 358 can detect the format pattern of the first header component Hc0 (DHF0) based on the first flags EOH0 and FORM0 included therein, and the second header component Hc1 (DHF1) based on the flags EOH0 and FORM0 in the first header component Hc0 and the flags EOH1 and FROM1 in the second header component Hc1.

At step S14, the data header Hd is read out, end is further interpreted in accordance with the format pattern detected at step S12 to extract the data discrimination information Di therefrom. This information Di identifies the data construction and data arrangement of data block Db, and is then transferred to the data decoder 357. Then, the procedure terminates.

In FIG. 14, a flow chart of data decoding process by the data decoder 357 is shown. On receipt of the header existence information Fd' and the data block Db from the packet decomposer 356 and the data discrimination information Di from the header analyzer 358, the data decoder 357 operates as follows.

At step S22, it is Judged whether the data header Hd is transferred from the packet decomposer 356, or not, based on the header existence information Fd'. When it is judged "NO", the procedure advances to step S24.

At step S24, the data block Db is decoded in accordance with a predetermined data discrimination information Dip. This is because that there is no data discrimination information Di is generated by the header analyzer 358. More specifically speaking, this is the case when the data having a construction pattern and arrangement known to both the transmission and receiving sides is communicated. Therefore, thus transmitted data block Db can be easily decoded. Then, the procedure advances to step S28.

At step S28, the audio and video signal Sav is reproduced based on thus decoded data block Db, and is further transferred to the external instruments (nod shown). Then, the procedure terminates.

However when it is judged "YES" at step S22 meaning that the transmitted packet data Pd includes the data header Hd, the procedure advances to step S26.

At step S26, the data block Db is decoded in accordance with the data discrimination information Di from the header analyzer 358.

As is apparent from the above, according to the present invention, it is possible to make the ratio of the data discriminator (EOH and FORM) in the header the same and constant even when the size of data header varies. Furthermore, when the data header becomes bigger, much more format patterns can be available for identifying the variety of data headers. This is a great convenience for transmitting such complicated and various data as NTSC, PAL, and MPEG which requires various format pattern peculiar to the kinds of devices connected to the bus.

Furthermore, it is also possible to communicate such a data having no data header between the transmission and receiving sides free from the miss-interpretation of the transmitted data, by providing a data flag indicating the existence of the data header at the top of the data to be transmitted so that the receiving side can recognize the absence of the data header by checking the data flag.

It is needless to say that the size of each header component Hc is not limited to 4 bytes, and the sizes of format flag FORM is not limited to 1 bit. Any other size can be optionally adopted for them, if necessary. For example, the more bits the format flag FORM has, the more format patterns can be identified. Furthermore, it is to be noted that the data transmission system according to the present invention can be applied to a parallel data transmission as well as a serial data transmission, and to an analog data as well as a digital data.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data transmission system for transmitting a data packet having a packet header region for storing a packet header and a data region for storing a data block, comprising:

data block generation means for producing said data block and a discrimination data indicative of the contents and size of said data block based on said data;

header generation means for generating a data header that includes a header end flag indicating whether additional header components exist, based on said discrimination data; and packet generation means for generating said data packet based on said data block and said data header.

2. A data transmission system as claimed in claim 1, wherein said packet generation means generates a first flag indicating the existence of said data header, said first flag being included in said packet header.

3. A data transmission system as claimed in claim 2, wherein said header generation means comprises:

an index means for producing an index based on said discrimination data;

a format pattern selection means for selecting one pattern from a plurality of predetermined header format patterns based on said index; and a header writing means for writing said data header in accordance with a selected header format pattern.

4. A data transmission system as claimed in claim 3, wherein said header writing means writes at least one header component having a predetermined fixed length at a top of said data region, each of said header components comprising a header data, said header end flag, and another flag which indicates, together with said header end flag and said another flag preceding thereto, a format pattern in which said header data is written.

5. A data transmission system as claimed in claim 1, wherein said header generation means comprises:

an index means for producing an index based on said discrimination data;

a format pattern selection means for selecting one pattern from a plurality of predetermined header format patterns based on said index; and a header writing means for writing said data header in accordance with a selected header format pattern.

6. A data transmission system as claimed in claim 5, wherein said header writing means writes at least one header component having a predetermined fixed length at a top of said data region, each of said header components comprising a header data, said header end flag, and a second flag which indicates, together with said header end flag and said second flag preceding thereto, a format pattern in which said header data is written.

7. A data transmission system as claimed in claim 2, further comprising:

first flag detection means for receiving said packet to produce an existence signal indicating whether said data header is present or absent in said data region based on said first flag; and data extraction means for extracting said data block from said packet based on said existence signal by depriving said packet header from said packet when said existence signal indicates the absence of said data header, and by depriving said packet header and said data header from said packet when said existence signal indicates the presence of said data header.

8. A data transmission system as claimed in claim 3, further comprising:

first flag detection means for receiving said packet to produce an existence signal indicating whether said data header is present or absent in said data region based on said first flag; and data extraction means for extracting said data block by depriving said packet header from said packet when said existence signal indicates the absence of said data header, and extracts said data block and said data header from said data region when said existence signal indicates the presence of said data header.

9. A data transmission system as claimed in claim 4, further comprising discrimination data detection means for detecting said discrimination data based on said header end flag and said another flag included in said data header.

10. A data transmission system as claimed in claim 9, wherein said discrimination data detection means comprises:

second flag detection means for detecting said header end flag and said another flag to produce a flag data;

format pattern detection means for detecting a header format pattern based on said flag data; and discrimination data extraction means for reading said data header in accordance with said detected header format pattern.

11. A data transmission system as claimed in claim 6, further comprising a data extraction means fur extracting said data block and said data header from said data region.

12. A data transmission system as claimed in claim 11, further comprising discrimination data detection means for detecting said discrimination data based on said header end flag and said second flag included in said data header.

13. A data transmission system as claimed in claim 12, wherein said discrimination data detection means comprises:

header end flag detection means for detecting said header end flag and said second flag to produce a flag data;

format pattern detection means for detecting said header format pattern based on said flag data; and discrimination data extraction means for reading said data header in accordance with said detected header format pattern.

14. A data transmission system, comprising:

a data block generator that produces a data block and a discrimination data indicative of the contents and size of said data block;

a header generator that generates a data header based on said discrimination data, said data header including a flag indicating whether an additional header component exists; and a packet generator that generates a packet based on said data block and said data header, wherein isochronous data is transmitted during predetermined periods of time, and asynchronous data is transmitted during time periods not used for transmitting isochronous data.

15. The data transmission system of claim 14, wherein said packet generator comprises:

an indexer that produces an index based on said discrimination data;

a format pattern selector that selects a header format pattern from among a plurality of header format patterns, based upon said produced index; and a header writer that writes said data header in accordance with said selected header format pattern.

* * * * *

UNITED STATES PATENT AND TRADEMARK OFFICE
CERTIFICATE OF CORRECTION

PATENT NO. : 5,646,941
DATED : July 8, 1997
INVENTOR(S) : T. NISHIMURA et al.

It is certified that error appears in the above-indentified patent and that said Letters Patent is hereby corrected as shown below:

At column 15, line 5 (claim 11, line 2), change "fur" to ---for---.

Signed and Sealed this

Thirtieth Day of December, 1997

Attest:

BRUCE LEHMAN

*Attesting Officer*     *Commissioner of Patents and Trademarks*